United States Patent [19]

Kemp, Jr.

[11] Patent Number: 5,039,111

[45] Date of Patent: Aug. 13, 1991

[54] COMPENSATING CONVEYOR SHAFT STATIC SEAL

[76] Inventor: Dennis E. Kemp, Jr., P.O. Box 167, South Orange, N.J. 07079

[21] Appl. No.: 472,866

[22] Filed: Jan. 31, 1990

[51] Int. Cl.⁵ ............................................. F16J 15/54
[52] U.S. Cl. .................................... 277/30; 277/176; 277/182; 277/186
[58] Field of Search ............... 384/130, 140, 141, 151, 384/477, 481, 482, 300, 901; 277/176, 177, 173, 83, 94, 212 F, 225, 227, 189, 181, 182, 183, 184, 186, 101, 237 A, DIG. 4, 30, 97

[56] References Cited

U.S. PATENT DOCUMENTS

| | | | |
|---|---|---|---|
| 2,161,767 | 6/1939 | Russell | 277/182 |
| 2,614,638 | 10/1952 | Beaupre | 277/181 X |
| 2,624,599 | 1/1953 | Eaton | 277/30 |
| 2,758,854 | 8/1956 | Fitzsimmons | 277/DIG. 4 |
| 3,130,976 | 4/1964 | Niswander | 277/227 X |
| 3,495,843 | 2/1970 | Andersen et al. | 277/183 |
| 3,509,890 | 5/1970 | Phillips | 277/152 X |
| 3,907,310 | 9/1975 | Dufour | 277/173 X |
| 3,988,026 | 10/1976 | Kemp, Jr. | 277/4 |
| 4,068,854 | 1/1978 | Douglass, Jr. | 277/186 X |
| 4,109,976 | 8/1978 | Koch | 277/30 X |
| 4,226,428 | 10/1980 | Paptzun | 277/94 |
| 4,258,927 | 3/1981 | Cother, Jr. | 277/152 |
| 4,309,063 | 1/1982 | Weis | 277/94 X |
| 4,365,707 | 12/1982 | Kemp, Jr. | 384/901 X |
| 4,494,759 | 1/1985 | Kieffer | 277/177 X |

FOREIGN PATENT DOCUMENTS

| | | | |
|---|---|---|---|
| 551751 | 1/1958 | Canada | 277/237 A |
| 137092 | 4/1985 | European Pat. Off. | 277/30 |
| 539005 | 8/1941 | United Kingdom | 277/237 A |

Primary Examiner—Allan N. Shoap
Attorney, Agent, or Firm—Mark T. Basseches; Paula T. Basseches

[57] ABSTRACT

A conveyor shaft seal for isolating a shaft bearing includes a resilient surrounding frame supporting a shaft embracing anti-friction sleeve. The innermost end of the sleeve within the conveyor is angled downwardly toward the conveyor wall whereby, during operation, the ingress of the material of the conveyor at the interface between shaft and sleeve is minimized, to extend the life of the bearing.

3 Claims, 2 Drawing Sheets

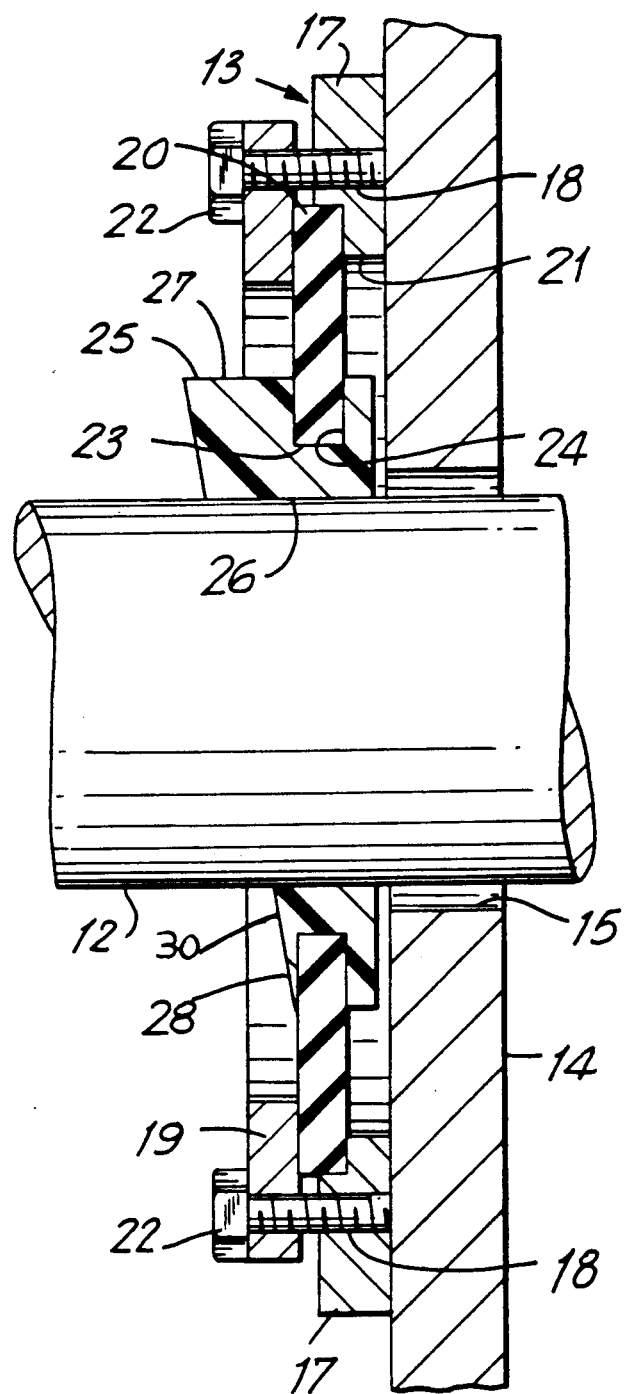

COMPENSATING CONVEYOR SHAFT STATIC SEAL

BACKGROUND OF THE INVENTION

1. Field of the Invention

The present invention is directed to a conveyor shaft seal and relates more particularly to an inexpensive and efficient bearing seal apparatus for preventing discharge of material into the shaft bearing.

2. The Prior Art

It is known to provide sealed shaft bearings for conveyors which employ as the sealing means a packing surrounding the shaft. In accordance with such devices the packing is compressed about the shaft by an annular insert adapted to be shifted longitudinally of the shaft and, since the packing is constrained in an annular cavity, such axial movement causes the packing to embrace the shaft.

Packing type seals have known disadvantages, including particularly the necessity for frequent adjustment to assure intimate pressure of the packing about the shaft. In addition, the packing exerts a high frictional drag, must be frequently replaced, and often results in scoring of the shaft.

A particular disadvantage of packing type seals resides in their inability to accommodate any significant eccentricities of the shaft.

In my U.S. Pat. Nos. 3,988,026 and 4,365,707 there are described improvements in conveyor shaft seals wherein the disadvantages of packing are obviated, the seals exhibiting protracted operating life and ability to accommodate significant shaft eccentricities. The seals of the noted patents, while having achieved substantial commercial success, are relatively expensive.

In accordance with a further known shaft seal apparatus there is provided a bearing member which embraces the shaft, the bearing being supported within a surrounding frame of elastomeric material. By so supporting the bearing a substantial amount of eccentricity of the shaft may be accommodated.

However, bearing seals of the last mentioned type have the disadvantage that material in the conveyor, particularly if it is finely divided and abrasive, rapidly enters the interface between shaft and bearing and compromises the seal therebetween.

SUMMARY OF THE INVENTION

The present invention may be summarized as directed to an improved conveyor shaft seal particularly useful in protecting the bearing of a driven auger. The seal is comprised of a frame or surround adapted to be mounted on the end wall of a conveyor trough, a polymeric sleeve member tighly encircling the shaft, and an intervening elastomeric body, whereby the seal is tiltably and shiftably supported on the conveyor wall.

A characterizing feature of the device resides in the configuration of the sleeve end portion within the conveyor, and particularly in that the end portion slants angularly downwardly so as to embrace greater portions of the upper section of the shaft and lesser portions of the shaft more closely located relative to the end wall of the conveyor.

I have unexpectedly discovered that by so inclining the end configuration of the seal forming sleeve, substantially longer life and reduced contamination of the bearing is achieved.

Without limitation, I have theorized that the inclined seal configuration described results in the creation of a void at the lower half of the junction between the shaft and shaft encircling sleeve, with the result that less pulverulent material is forced into the interface between sleeve and shaft.

I have further theorized that with conventional seals of the general type described, ingress of such material is the result of pressure build-up in the portions beneath the shaft adjacent the sleeve end due to the compacting influences of the rotating shaft. With the device of the invention the movement of the shaft in proximate relation to the cutaway effects the creation of a void where pulverulent material normally would enter the interface between shaft and sleeve.

BRIEF DESCRIPTION OF THE DRAWINGS

FIG. 2 is a magnified fragmentary vertical section taken on the line 2—2 of FIG. 1.

Figure 1:
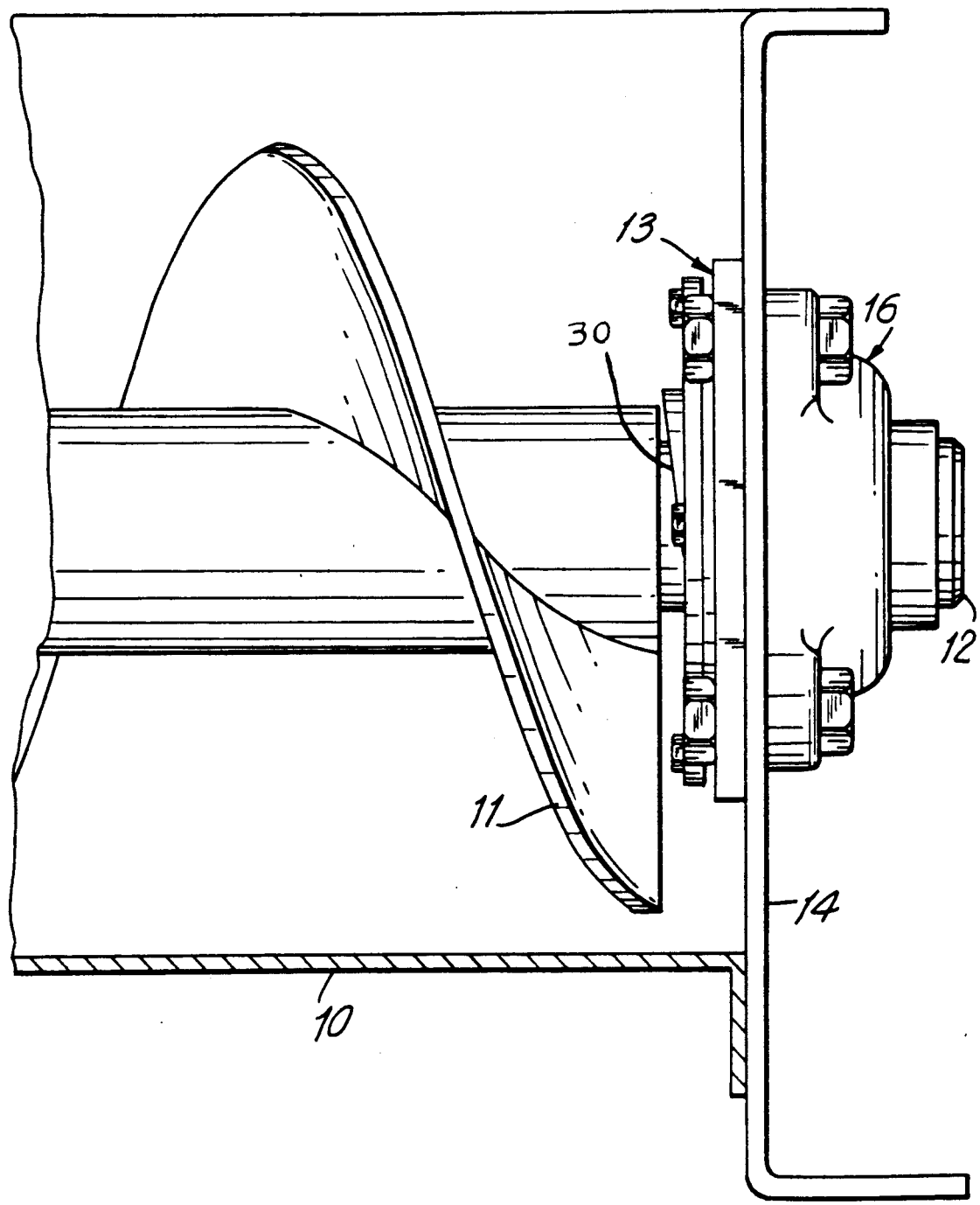
FIG. 1 is a side elevational view of the end portion of a conveyor assembly depicting the shaft seal supported in a bearing of commercial manufacture.

In accordance with the invention there is shown in FIG. 1, in largely schematic form, an end of a conveyor housing 10 wherein auger 11 is mounted on rotatable shaft 12.

Shaft 12 extends through a bearing seal assembly 13 mounted on inside trough end 14 of the housing. More particularly, end wall 14 includes an opening 15 adjacent which seal assembly 13 is received.

A conventional shaft bearing 16 is mounted on the external surface of the housing end 14 and supports the shaft. It is the function of the seal 13 to prevent the passage of trough contents to the bearing 16.

The seal assembly 13 includes a steel housing plate 17 having bolt holes 18 enabling the same to be mounted to the wall 14.

A frame member 19 of metal or rigid polymer clampingly supports the periphery of elastomeric surround 20, the surround 20 thus being clamped between frame 19 and plate 17, the plate 17 including a central aperture 21 surrounding the aperture 15 in wall 14. The frame may be maintained in position as by mounting bolts 22.

The elastomeric surround 20 includes a central aperture 23 disposed within a groove 24 formed in the outer periphery of a polymeric sleeve 25.

The through-going bore 26 in the sleeve 25 intimately engages the outer diameter of shaft 12, defining a tight seal therewith.

Sleeve 25 is preferably made of an anti-friction material such as Delrin (a trademark of DuPont Corporation).

A characterizing feature of the invention resides in the formation of the inwardly facing surface 30 of the sleeve 25 in a sloped configuration from the upper end 27 to the lower end 28, i.e. the face 30 slopes downwardly toward wall 14.

When shaft 12 is driven as by the prime mover (not shown), by virtue of the inclination of the bearing end a void in the material disposed in the conveyor is formed at a position surrounding the interface between the shaft and the portions of the end face 30 of sleeve 25 below the shaft. It is this specific area where materials under pressure would be most prone to enter between the lower end of the shaft and the sleeve if the sleeve end 30 were arrayed perpendicular to the shaft axis rather than inclined, as described.

Without limitation, an inclination of face 26 relative to the shaft axis from about 8° to 20° has been found to be preferred.

Since the sleeve 25 is supported by the elastomeric surround 20, significant eccentricities of the shaft and inclinations thereof relative to end wall 14 with resultant application of forces against the sleeve may be accommodated without any loss of sealing function as a result of distortion of the elastomeric surround.

From the foregoing it will be perceived that there is provided in accordance with the invention a simple, effective and long lived conveyor shaft bearing seal capable of accommodating significant eccentricities and angular misalignment of the shaft.

By virtue of the unique end configuration of the seal component, the seal life exceeds by a substantial margin that of an identically constructed seal whose end face is perpendicular to the shaft axis.

Having thus described the invention and illustrated its use, what is claimed as new and is desired to be secured by Letters Patent is:

1. A shaft seal device for isolating bearings of a conveyor, said bearings being mounted externally of an end wall of said conveyor, comprising a generally planar mounting frame adapted to be secured to said end wall, an elastic insert supported within said frame, a cylindrical bearing sleeve of anti-friction material mounted within and extending through said insert with its longitudinal axis disposed generally perpendicular to said frame, said sleeve having first and second axially facing end surfaces disposed at opposite sides of said insert, said first end surface, in the mounted portion of said seal device, being directed away from said wall and toward the interior of said conveyor, and said second end surface in said mounted position being directed toward said bearings, said sleeve being movable relative to said frame responsive to forces applied against said sleeve with resultant distortion of said insert, said first end surface of said sleeve being inclined in a plane angularly offset from the plane of said frame with the axially uppermost end of the formed incline of said first end surface being spaced farther from said plane of said frame than the axially lowermost end of the formed incline of said first end surface.

2. A seal device in accordance with claim 1 wherein said anti-friction material comprises a polymer.

3. A seal device in accordance with claim 1 wherein said first end surface is inclined toward said plane of said frame at an angle of from about 8° to 20°.

* * * * *